UNITED STATES PATENT OFFICE 2,539,472

PROCESS FOR THE PURIFICATION OF CERTAIN WATER-SOLUBLE HYDROXYCARBOXYLIC ACIDS

William P. Ratchford, Philadelphia, and Charles H. Fisher, Abington, Pa., assignors to the United States of America as represented by the Secretary of Agriculture No Drawing. Application July 15, 1949, Serial No. 105,052

9 Claims. (Cl. 260—535)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to hydroxycarboxylic acids and has as an object the provision of improved methods for the recovery of hydroxycarboxylic acids, particularly lactic acid, from aqueous solutions. Another object is the provision of a method for recovering the free hydroxycarboxylic acids from their amine salts. A further object of the invention is to provide a process for the production of purified lactic acid from aqueous solutions of crude technical lactic acid.

Aqueous solutions of crude technical lactic acid obtained in fermentation processes contain various organic and inorganic impurities such as salts, volatile matters, unfermentable carbohydrates, dark colored impurities, and so forth. We have found that lactic acid can be recovered from such an aqueous solution by contacting the solution with an organic, basic, nitrogeneous compound, particularly an amine selected from the group consisting of a secondary and tertiary alkyl amine containing from 5 to 12 carbon atoms in each alkyl group, adapted to form an organic solvent soluble salt of lactic acid, forming a solution of the resulting salt in an organic, water immiscible solvent, and then recovering the lactic acid from the organic solvent phase.

According to the process of our invention, the lactic acid present in the aqueous solution is caused to react with an amine, preferably one selected from the group consisting of a secondary and tertiary alkyl amine containing from 5 to 12 carbon atoms in each alkyl group, to form the corresponding amine salt of lactic acid, by contacting the aqueous solution of lactic acid, at ordinary room temperature or with application of heat, with approximately the equimolecular amount or an excess of the amine, in the presence of, or preferably dissolved in, a water immiscible organic solvent, which may be an excess of the amine itself, adapted to dissolve the salt formed by the interaction of lactic acid with the amine. A preferred water immiscible organic solvent is one selected from the group consisting of an alcohol containing at least four carbon atoms and chloroform. The organic solvent phase thus obtained is then separated from the aqueous phase by stratification or by other suitable means, and the amine salt of lactic acid present therein is decomposed to liberate the lactic acid which can then be recovered by any suitable means.

In general, the amines best adapted for use in our process are those which form lactic acid salts that are more readily soluble in water immiscible organic solvents than in water, or aqueous media, and which do not display pronounced surface activity. Suitable amines include secondary amines, such as higher dialkyl amines free from alkyl groups containing more than 12 to 14 carbon atoms like didecylamine; secondary cyclic alkylamines; secondary alkaryl amines wherein the nitrogen atom is bonded to non-nuclear carbon atoms; and trialkyl amines free from alkyl groups containing more than 12 to 14 carbon atoms, such as triamylamine and trioctylamine. Secondary and tertiary amines containing an alkyl group of more than 12 to 14 carbon atoms form lactic acid salts which usually possess pronounced surface activity and thus tend to cause emulsification of the immiscible media in the course of the commingling step, thereby rendering the subsequent separation of the two phases less readily attainable. The segregation of lactic acid from aqueous solutions is best effected by using didecylamine, triamylamine or trioctylamine in view of the ready solubility of the lactic acid salts of these amines in water immiscible organic solvents. Suitable organic solvents include the amine itself, water immiscible aliphatic alcohols such as n-butanol, isobutyl alcohol, n-amyl, isoamyl, secondary amyl and tertiary amyl alcohols, methyl isobutyl carbinol, diethyl carbinol, 2-ethyl hexanol, heptanol-3, octanol-2 and the like; esters such as ethyl acetate; benzene and other aromatic hydrocarbon solvents, nitrobenzene and chlorinated solvents such as chloroform.

The decomposition of the lactic acid salt contained in the organic solvent phase to liberate the lactic acid, and the subsequent recovery of the acid may be effected by the action of an oxide, hydroxide or carbonate of a group I or II metal, such as sodium hydroxide, sodium carbonate, calcium oxide, calcium hydroxide, calcium carbonate, magnesium oxide, magnesium hydroxide, zinc oxide, and so forth, to liberate the amine and form the corresponding metal lactate. The amine is then separated from the aqueous metal lactate which is then converted to free lactic acid with a suitable mineral acid such as sulfuric, sulfurous, hydrochloric, phosphoric or pyrophosphoric acid.

We have found, however, that the salts formed by interaction of a hydroxycarboxylic acid, such as lactic, tartaric or citric acid, with an amine adapted for use in our process, are decomposed to yield the amine and free hydroxycarboxylic acid on subjecting the organic solvent phase containing the salt to steam distillation at atmospheric pressure or with superheated steam.

Distillation at subatmospheric pressure also may be used. This method of recovering lactic acid yields most satisfactory results when applied to salts formed by interaction of lactic acid with trialkyl amines containing from about 12 to about 24 carbon atoms in the three alkyl radicals of the amine, that is, to the lactic acid salts of tributyl, triamyl, trihexyl, triheptyl and trioctyl amine and of their structurally isomeric trialkyl amines which do not contain any alkyl group having more than 12 to 14 carbon atoms like, for example, amyl octyl methylamine, methyl dioctyl or methyl dinonylamine. The recovery of lactic acid by this distillation procedure is most readily effected at atmospheric pressure when the lactic acid salt is the salt of tributylamine or triamylamine, the use of which is therefore preferred.

The recovery of lactic acid by the distillation method is conducted by subjecting the organic solvent phase containing the amine salt of lactic acid to steam distillation, in a conventional manner, thereby recovering the organic solvent and the free amine in the distillate and obtaining free lactic acid in the distillation residue. Our process may be operated either continuously or as a batch process.

The following examples are given as illustrative embodiments of a manner in which our invention may be carried out in practice.

Lactic acid was treated with various amines, used in an amount slightly exceeding the equimolecular, by combining equal volumes of a chloroform solution of the amine and a 9 percent solution of lactic acid in water. The mixture was rocked mechanically for 30 minutes. The two phases were then allowed to stratify, and the solvent phase was analyzed by treatment with an excess of normal alkali solution which was then separated and backtitrated.

Some of the results so obtained are shown in the following table:

TABLE I

| Example | Amine Used | Initial Lactic Acid Found in Solvent Phase |
|---|---|---|
| | | Per Cent |
| I | Didecyl | 89 |
| II | Dicyclohexyl | 48 |
| III | Dibenzyl | 37 |
| IV | Diethyl butyl | 40 |
| V | Tributyl | 44.5 |
| VI | Triamyl | 74 |
| VII | Trioctyl | 90 |

Example VIII 50 ml. of the organic solvent phase obtained as described in Example VI was steam distilled at atmospheric pressure. The initial distillate consisted of chloroform and water, and was followed by triamylamine and water. The amine was obtained as a supernatant oily layer and was identified from its refractive index ($N_D^{20}$ 1.4382) and neutralization equivalent (223.5). When about 350 cc. of distillate had been collected, the condensate was found to be free from amine and the distillation was discontinued. The distillation residue was titrated for free acidity and found to contain 71.5 percent of the initial amount of lactic acid. Thus the recovery of the free lactic acid from the solvent phase was 96.5%.

Example IX

The solvent phase obtained by the procedure of Example V was treated essentially as described in Example VIII. Chloroform and tributylamine were recovered in the distillate. The distillation residue was found to contain free lactic acid in an amount corresponding to 25 percent of the initial acid.

Example X

To 20 ml. of crude technical lactic acid (dark grade), of 22 percent concentration were added 50 ml. of a chloroform solution containing triamylamine in 24 percent excess. After mechanical mixing for 30 minutes the solvent layer was steam distilled to remove solvent and triamylamine. The distillation residue was found to contain 75 percent of the initial lactic acid as a 17 percent aqueous solution.

Example XI

Following the procedure of Example X, technical lactic acid was treated with triamylamine using carbon tetrachloride as the solvent medium. On stratification of the mixture three layers were formed. The water-rich layer was separated and the remaining layers were combined and steam distilled. The distillation residue was treated with a small amount of decolorizing carbon, while warm, and filtered. The straw-colored filtrate was found to contain free lactic acid in an amount corresponding to 50 percent of the initial lactic acid.

Example XII

The procedure of Example X was repeated, using heptanol-3 as the solvent. An aliquot of the solvent layer was decolorized by treatment with activated carbon. The thus refined solvent layer was found to contain 68 percent of the initial lactic acid in the form of the amine salt. Another portion of the solvent layer was steam distilled to remove solvent and amine. The dark distillation residue so obtained was treated with activated carbon and filtered. The light straw-colored filtrate was found to contain free lactic acid in an amount corresponding to 78 percent of the initial acid.

Example XIII

The procedure of Example X was repeated using tertiary amyl alcohol as the solvent. Steam distillation of the organic solvent phase yielded an amber colored residue containing 74 percent of the initial lactic acid in the free form.

The following Examples XIV through XXX show the relative effectiveness of some water immiscible solvents in the process of this invention. In each of these examples 25 cc. of 9 percent lactic acid solution in water were treated with a slight excess of triamylamine dissolved in 20 ml. of solvent. After mixing for 30 minutes the solvent phase was analyzed as described in Examples I through VII.

The results obtained are shown in the following table:

| Example | Solvent | Per cent of Initial Lactic Acid Found in Solvent Phase |
|---|---|---|
| XIV | Ethyl Acetate | 38.5 |
| XV | Benzene | 29 |
| XVI | Heptanol-3 | 63 |
| XVII | n-Butanol | 83 |
| XVIII | Amyl alcohol | 80.5 |
| XIX | Methyl Isobutyl carbinol | 70.5 |
| XX | Isoamyl alcohol | 82 |
| XXI | 2-Ethyl hexanol | 67 |
| XXII | Chloroform | 78 |
| XXIII | Tert. Amyl alcohol | 72.5 |
| XXIV | Sec. Amyl alcohol | 77 |
| XXV | Diethyl carbinol | 77 |
| XXVI | Octanol-2 | 86 |
| XXVII | Isobutyl alcohol | 81.5 |
| XXVIII | Diethyl ether | 9.5 |
| XXIX | Pinene | 18 |
| XXX | Triamylamine | 16 |

Similar results were obtained using other amines, suitable for use in the present process, in lieu of triamylamine.

We claim:

1. A process comprising reacting a hydroxycarboxylic acid contained in aqueous solution with an organic amine selected from the group consisting of a secondary and tertiary alkyl amine containing from 5 to 12 carbon atoms in each alkyl group to form an organic solvent soluble salt of said hydroxycarboxylic acid and the amine, said reaction being conducted in the presence of an organic, water immiscible solvent adapted to dissolve said salt of said amine and hydroxycarboxylic acid and selected from the group consisting of an alcohol containing at least four carbon atoms and chloroform, separating the resulting solution of the formed salt of the amine and hydroxycarboxylic acid in the organic water immiscible solvent, decomposing said salt to liberate the free hydroxycarboxylic acid, and recovering the hydroxycarboxylic acid.

2. The process of claim 1 wherein the hydroxycarboxylic acid is lactic acid.

3. The process of claim 1 wherein the hydroxycarboxylic acid is tartaric acid.

4. The process of claim 1 wherein the hydroxycarboxylic acid is citric acid.

5. The process of claim 1 wherein the aqueous solution containing the hydroxycarboxylic acid is crude technical lactic acid.

6. A process comprising reacting lactic acid contained in aqueous solution with an organic amine selected from the group consisting of a secondary and tertiary alkyl amine containing from 5 to 12 carbon atoms in each alkyl group to form an organic solvent soluble salt of lactic acid and the amine, said reaction being conducted in the presence of an organic, water immiscible solvent adapted to dissolve said formed amine salt of lactic acid and selected from the group consisting of an alcohol containing at least four carbon atoms and chloroform, separating the resulting solution of the formed amine salt of lactic acid in the organic solvent, and subjecting this solution to steam distillation to produce a distillate containing the organic solvent and the free amine and a distillation residue containing free lactic acid.

7. The process of claim 6 wherein the organic amine is a trialkyl amine.

8. The process of claim 6 wherein the organic amine is triamylamine.

9. The process of recovering lactic acid from a salt of lactic acid and a trialkylamine containing from 5 to 12 carbon atoms in each alkyl group, comprising forming a solution of said salt in an organic, water immiscible solvent selected from the group consisting of an alcohol containing at least four carbon atoms and chloroform, and subjecting the solution to steam distillation thereby to form a distillate containing the free amine and the organic solvent and a distillation residue containing free lactic acid.

WILLIAM P. RATCHFORD.
CHARLES H. FISHER.

REFERENCES CITED

The following references are of record in the file of this patent:

UNITED STATES PATENTS

| Number | Name | Date |
|---|---|---|
| 686,170 | Waite | Nov. 5, 1901 |
| 2,092,494 | Bass | Sept. 7, 1937 |
| 2,186,249 | Lazar et al. | Jan. 9, 1940 |
| 2,222,993 | Toennies | Nov. 26, 1940 |
| 2,319,545 | Harris et al. | May 18, 1943 |

FOREIGN PATENTS

| Number | Country | Date |
|---|---|---|
| 169,992 | Germany | May 1, 1906 |